United States Patent
Wang et al.

(10) Patent No.: US 9,342,298 B2
(45) Date of Patent: May 17, 2016

(54) APPLICATION COMPATIBILITY CHECKING IN A DISTRIBUTED COMPUTING ENVIRONMENT

(71) Applicant: MICROSOFT CORPORATION, Redmond, WA (US)

(72) Inventors: Daniel C. Wang, Kirkland, WA (US); Jun Wang, Redmond, WA (US); Ismet Erensoy Kahraman, Seattle, WA (US); Aaron Edward Spinks, Redmond, WA (US); Vikram Madhav Dhaneshwar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/826,477

(22) Filed: Mar. 14, 2013

(65) Prior Publication Data

US 2014/0282395 A1  Sep. 18, 2014

(51) Int. Cl.
 *G06F 9/44* (2006.01)
 *G06F 9/445* (2006.01)

(52) U.S. Cl.
 CPC ... *G06F 8/71* (2013.01); *G06F 8/60* (2013.01); *G06F 8/61* (2013.01)

(58) Field of Classification Search
 None
 See application file for complete search history.

(56) References Cited

U.S. PATENT DOCUMENTS

| | | | |
|---|---|---|---|
| 5,579,509 A * | 11/1996 | Furtney et al. | 703/27 |
| 6,055,363 A * | 4/2000 | Beals et al. | 709/201 |
| 6,324,692 B1 * | 11/2001 | Fiske | 717/171 |
| 6,704,933 B1 * | 3/2004 | Tanaka et al. | 725/132 |
| 6,769,114 B2 * | 7/2004 | Leung | 717/124 |
| 6,862,615 B1 * | 3/2005 | Ehrlich et al. | 709/221 |
| 6,898,768 B1 | 5/2005 | Theodossy et al. | |
| 7,401,331 B2 | 7/2008 | Leung | |
| 7,506,336 B1 * | 3/2009 | Ninan | 717/175 |
| 7,600,219 B2 * | 10/2009 | Tsantilis | G06F 8/71 707/999.202 |
| 7,890,919 B1 * | 2/2011 | Williams | 717/100 |
| 8,266,604 B2 | 9/2012 | Groff et al. | |

(Continued)

OTHER PUBLICATIONS

Il-Chul Yoon et al., "Effective and Scalable Software Compatibility Testing", ACM, 2003, <http://www.cs.umd.edu/~atif/pubs/YoonSussmanMemonPorterISSTA2008.pdf>, pp. 1-11.*

(Continued)

*Primary Examiner* — Thuy Dao
*Assistant Examiner* — Samuel Hayim
(74) *Attorney, Agent, or Firm* — Ben Tabor; Kate Drakos; Micky Minhas

(57) ABSTRACT

In various embodiments, methods and systems for maintaining compatibility between applications, based on feature-set constraints are provided. A distributed computing system provides Platform as a service (PaaS) including a software framework in a service model of cloud computing. A known compatibility baseline is established for features of a first application and a second application. The known compatibility baseline inherently includes a baseline set of unenumerated features of the applications. It is determined that the first application is compatible with second application based on comparing an explicit enumeration of added features or removed features in a feature set of the applications. The added features or removed features are tracked after the baseline set of unenumerated features is defined. The determination whether the first application and the second application are compatible is communicated for processing the first application and/or the second application.

19 Claims, 5 Drawing Sheets

(56) References Cited

U.S. PATENT DOCUMENTS

| | | | |
|---|---|---|---|
| 8,286,159 B2 | 10/2012 | Shapiro | |
| 8,645,936 B2* | 2/2014 | Mahajan | 717/168 |
| 2002/0078262 A1* | 6/2002 | Harrison | G06F 9/44552 719/331 |
| 2002/0092007 A1* | 7/2002 | Harrington | G06F 8/76 717/168 |
| 2002/0092010 A1* | 7/2002 | Fiske | G06F 11/1417 717/168 |
| 2002/0120940 A1* | 8/2002 | Willard | G06F 8/41 725/91 |
| 2002/0188938 A1* | 12/2002 | Dong | G06F 9/4415 717/174 |
| 2003/0035005 A1* | 2/2003 | Kodosky et al. | 345/763 |
| 2003/0084437 A1* | 5/2003 | Cashin | G06F 8/60 717/174 |
| 2003/0110482 A1* | 6/2003 | Ferguson | G06F 8/65 717/168 |
| 2003/0140339 A1* | 7/2003 | Shirley | H04W 24/02 717/171 |
| 2003/0159135 A1* | 8/2003 | Hiller | G06F 9/44536 717/166 |
| 2003/0163804 A1* | 8/2003 | Burke et al. | 717/170 |
| 2003/0192041 A1* | 10/2003 | Mentze et al. | 717/177 |
| 2004/0181790 A1* | 9/2004 | Herrick | 717/168 |
| 2005/0022176 A1* | 1/2005 | Ramachandran et al. | 717/170 |
| 2005/0132346 A1* | 6/2005 | Tsantilis | G06F 8/71 717/168 |
| 2005/0160421 A1* | 7/2005 | Bluvshteyn et al. | 717/174 |
| 2007/0234352 A1 | 10/2007 | Esders et al. | |
| 2008/0141170 A1* | 6/2008 | Kodosky et al. | 715/810 |
| 2009/0064132 A1* | 3/2009 | Suchy et al. | 717/177 |
| 2009/0113088 A1* | 4/2009 | Illowsky et al. | 710/62 |
| 2010/0146485 A1 | 6/2010 | Guertler | |
| 2010/0299663 A1* | 11/2010 | Weissman et al. | 717/170 |
| 2011/0296380 A1* | 12/2011 | Dvinov et al. | 717/122 |
| 2012/0084769 A1* | 4/2012 | Adi et al. | 717/174 |
| 2012/0222025 A1* | 8/2012 | Pandit | 717/170 |
| 2012/0272228 A1 | 10/2012 | Marndi et al. | |

OTHER PUBLICATIONS

Johannes Zaha et al., "Compatibility Test for Coordination Aspects of Software Components", IEEE, 2006, <http://ieeexplore.ieee.org/stamp/stamp.jsp?tp=&arnumber=1615037>, pp. 1-8.*

Il-Chul Yoon et al., "Direct-Dependency-based Software Compatibility Testing", ACM, 2007, <http://delivery.acm.org/10.1145/1330000/1321696/p409-yoon.pdf>, pp. 1-4.*

Yoon, et al., "Effective and Scalable Software Compatibility Testing", In Proceedings of the International Symposium on Software Testing and Analysis, Jul. 20, 2008, 11 pages.

Burger, et al., "Metamodel Evolution in the Context of a MOF-based Metamodeling Infrastructure", In Doctoral Dissertation, Master's Thesis, University of Karlsruhe, Sep. 30, 2008, 77 pages.

Mouakher, et al., "Component Adaptation: Specification and Verification", In 11th International Workshop on Component Oriented Programming, Jul. 3, 2006, 8 pages.

"Apache Portable Runtime Project", Retrieved on: Feb. 4, 2013, Available at: http://apr.apache.org/versioning.html.

"International Search Report & Written Opinion for PCT Patent Application No. PCT/US2014/023212", Mailed Date: May 27, 2014, Filed Date: Mar. 11, 2014, 12 Pages.

* cited by examiner

APPLICATION COMPATIBILITY CHECKING IN A DISTRIBUTED COMPUTING ENVIRONMENT

BACKGROUND

Generally, a distributed computing system is hosted in cloud computing systems (across various nodes) and is intended primarily to share resources to achieve efficiency in a converged infrastructure of shared services. The distributed computing system may support, for example, Platform as a service (PaaS) that provides a computing platform (e.g., hardware architecture and software framework) and a solution stack (e.g., operating system, web server, database and programming language) in a service model of cloud computing. In this service model, the consumer creates the software using tools and/or libraries from the provider. The consumer also controls software deployment and configuration settings. The provider provides the networks, servers, storage and other services. This model may also include multiple developers working on different applications with interdependencies. An application component (e.g., feature) may have a dependency with another application component running on the software framework or an application component may have a dependency on a software framework component. Compatibility checks between the applications and between applications and the software framework are necessary before deployment and upgrades. In addition, the service model provides for frequent changes in detailed features in the application which augments the complexity assuring compatibility.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method for maintaining compatibility between applications, based on feature-set constraints. A known compatibility baseline is identified for a first application and a second application. The known compatibility baseline is associated with a baseline set of unenumerated features of the applications. The known compatibility baseline may be determined based on compatibility testing. Determining compatibility between applications signals a compatibility baseline between the applications without explicit enumeration of features in the applications. It is determined that the first application is compatible with second application based on comparing an explicit enumeration of added features or removed features in a feature set of the applications. The added features or removed features are tracked after the baseline set of unenumerated features is defined. The determination whether the first application and the second application are compatible is communicated for processing the first application and/or the second application.

BRIEF DESCRIPTION OF THE DRAWINGS

The present invention is described in detail below with reference to the attached drawing figures, wherein.

DETAILED DESCRIPTION

Figure 1:
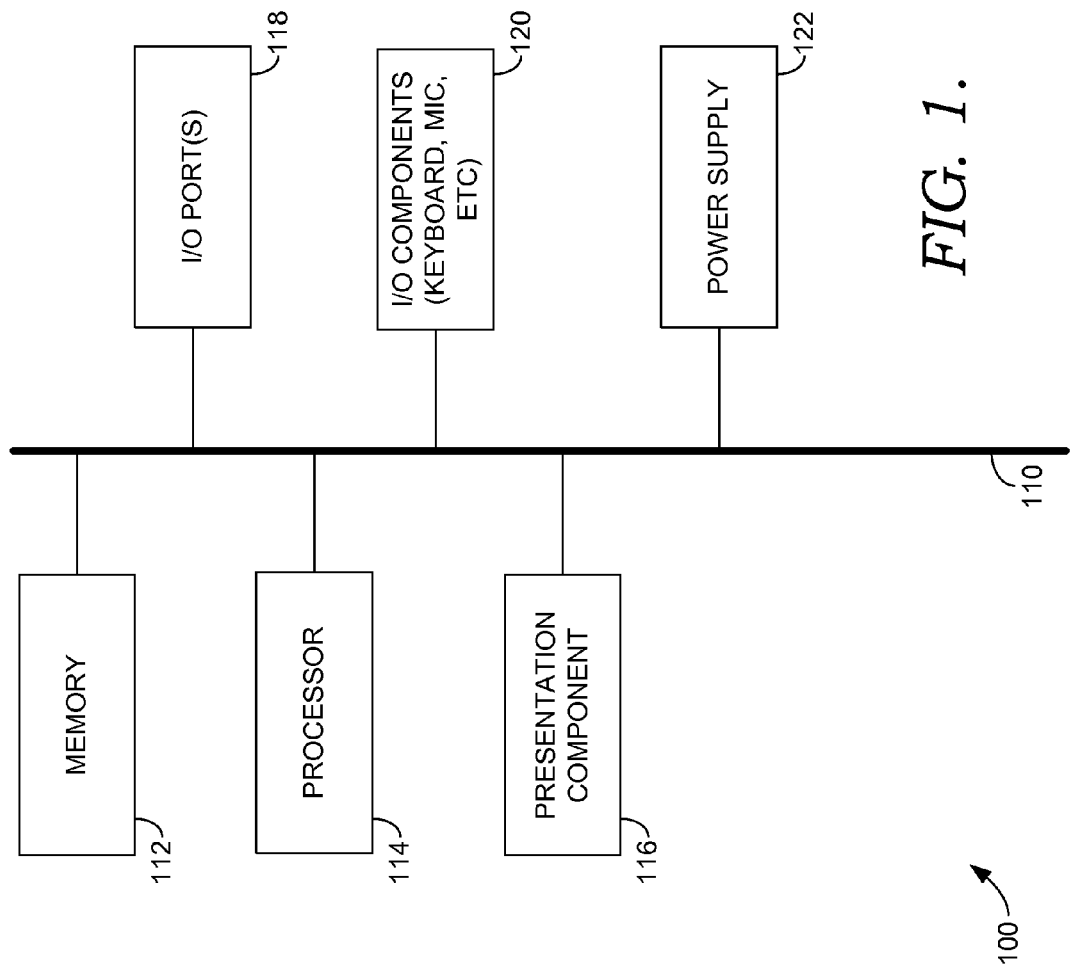
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a cloud computing distributed system with an application and an software framework; however, it is understood that the application and software framework are used for exemplary purposes and a compatibility check process described herein may be used for maintaining compatibility between different types of applications. Further, while embodiments of the present invention may generally refer to the components described herein, it is understood that an implementation of the techniques described may be extended to other components performing the steps described.

Typically, a cloud computing distributed system acts to store data and/or run applications in a distributed manner. For instance, Platform as a service (PaaS) provides a computing platform (e.g., hardware architecture and software framework) and a solution stack (e.g., operating system, web server, database and programming language) in a service model of cloud computing. In this service model, the consumer creates service applications using tools and/or libraries from the provider. The consumer may also control service application deployment and configuration settings. The provider provides the networks, servers, storage and other services that include service applications running with service applications of the consumer. Applications of the distributed computing system may include nodes and virtual machines that are allocated to run one or more portions of applications. When more than one separate application is being supported by the nodes, the nodes may be partitioned into virtual machines that concurrently run the separate applications, respectively, in individualized computing environments that support the resources and/or operating system specific to each application. As used herein, application may refer to software frameworks, operating systems, service applications, roles, and any combinations and variations thereof. It should be understood and appreciated by those of ordinary skill in the art that other suitable structures of cloud computing distributed systems may be used, and that embodiments of the present invention are not limited to those applications across virtual machines described herein.

At a high level, applications may be developed for different types of environments including a cloud computing distributed system where applications are built within a particular software framework. A software framework (e.g., .NET software framework offered by the Microsoft Corporation of Redmond Wash.) may refer to an abstraction in which software providing generic functionality may be selectively changed by additional user written code, thus providing application specific software. The software framework may be a universal, reusable software platform used to develop applications, products and solutions. The software framework may include a large library that provides language interoperability. The software framework may include support programs, compilers, code libraries and application programming interfaces (API) and tool sets that bring all different components to enable development of a project or solution.

In developing applications for a software framework, programmers may produce applications by combining their own source code with the software framework, and other libraries. For example, developers may utilize an application component (e.g., application feature) that receives messages from the software framework component (e.g., software framework feature). In this regard, the applications may need a required feature from the software framework and the software framework provides that particular feature. Component types may include user interface, user process, service agent, service interface and security. For example, a user interface component may function to provide a data display and acquire and validate user input; the user interface supported by both application feature (e.g., user-defined classes) and the software framework feature (e.g., predefined classes).

Further, the software framework may provide components that are used by application components to accomplish a range of common programming tasks, including tasks such as string management data collection, database connectivity, and file access. For example, the software framework may include classes that expedite and optimize the development process and provide access to system functionality. The software framework components and associated application components may be altered to provide updated versions of the application. In embodiments, the software framework may support extensibility in that the framework may be extended by the user usually by selectively overriding or specialized by user code to provide specific functionality. Extensions may be provided to improve and maintain products and solutions through addition of new functionality or through modification of existing functionality. Extending the software framework may affect the custom-driven applications running on the software framework.

By way of example, the software framework components may be extended to further support specialized development scenarios thus creating dependencies for one or more applications associated with the particular component. Applications using software framework components may call a component for the application to execute in an intended manner. During application development and testing the application is observed to confirm compatibility between the application and the software framework. It is contemplated within embodiments of the present invention that components may include service components (e.g., workflow service or service bus) provided by the software framework and required by the application, that may also be updated and maintained. As such, a variety of techniques may be utilized to update interdependent components of the software framework and/or applications and similarly to confirm compatibility between them.

As an application evolves over time, the application may assume certain environmental dependencies with other applications and/or the software framework to function properly. As such, the changes in the components of the application and/or the software framework may be tracked to maintain compatibility as both the application and the software framework evolve to updated versions. In addition, in a distributed computing system, for example, a cloud computing distributed system supporting PaaS, configuration changes are based on customer needs and deployments occur at a rapid rate that is different from traditional formalized software development version controls. Traditional software development version controls may be characterized as major or minor releases that simply rely on version numbers without feature enumeration and lack support for breaking behavior changes. Distributed computing systems with software frameworks and associated applications, which are frequently and selectively changed to provide specific functionality, call for a compatibility check process that provides a seamless way of maintaining the compatibility between applications in order to perform upgrades to the application and/or software framework, for example.

Embodiments of the present invention introduce technology within the distributed computing system to upgrade applications based on a compatibility check process using feature-set constraints of the applications. As used herein, features refer to a prominent or characteristic application behavior that impacts the compatibility of the application with other applications. Feature may be used interchangeably with component when describing an application or the software framework. The distributed computing system is not meant to be limited to any particular configuration of the application infrastructure, but broadly refers to any compilation of devices (e.g., network devices, computing devices, power-supply devices that may integrated within a fabric). For example, the distributed computing system may be located within a data center managed by a cloud computing service provider (e.g., WINDOWS AZURE cloud computing offered by the Microsoft Corporation of Redmond Wash.) where implementing the compatibility check process allows for upgrading applications of a customer using the distribution computing system. The compatibility check process uses feature-set constraints of the applications in that the feature changes of each application, tracked from a known compatibility baseline of the applications, are compared to determine compatibility of updated versions of the applications. In other words, the compatibility check process is based, in an exemplary aspect, on the number of explicit changes in the applications over time, not actual dependencies of all features. In this regard, the compatibility check process does not necessitate explicit enumeration of all features in the applications, which otherwise would be a tedious task. In embodiments, maintaining the compatibility between applications may include a determination of a change type associated with an updated version of the application, which dictates whether a feature is enumerated as added or removed from the feature set.

In operation, by way of example, an application may include a plurality of application features and a software framework may include a plurality of software framework features. The application and the software framework are compatible, which creates a known compatibility baseline from which maintaining the compatibility between the applications may begin. As the application and the software framework evolve from the known compatibility baseline, each may add new features which may be tracked. The set of features may be referred to as, feature-set constraints, associated with the particular application or software framework. The feature-set constraints may be used to determine compatibility, capitalizing on the fact that each release of the application or software framework is substantially similar to the previous release. Thus, the feature-set constraints of the application and the software framework from the known compatibility baselines include added features or removed features relative to the baseline. In this regard, the explicit set of all features in the application or software framework is not required to determine compatibility; enumerating a set of all features (e.g., application behaviors) may also prove difficult as not all compatibility features may be anticipated in advance. Instead, the compatibility of the application with the software framework may simply be determined if one feature set is contained within the feature set of the other.

Accordingly, in a first aspect of the present invention, one or more computer-readable media storing computer-useable instructions that, when used by one or more distributed computing systems, cause the one or more distributed computing systems to perform a method for maintaining compatibility between applications based on feature-set constraints. The method includes identifying a first application that is compatible with a second application based on a baseline set of features associated with the first application and the second application. The method also includes determining, based on comparing an explicit enumeration of added features or removed features in a feature set of the first application and a feature set of the second application, that the first application is compatible with the second application, wherein the added features or removed features are tracked after a known compatibility baseline is defined based on the baseline set of unenumerated features. The method further includes communicating a determination that the first application and the second application are compatible.

In a second aspect of the present invention, one or more computer-readable media storing computer-useable instructions that, when used by one or more computing devices, cause the one or more computing devices to perform a method for maintaining compatibility between applications based on feature-set constraints. The method includes identifying a first application that is compatible with a second application based on a baseline set of unenumerated features associated with the first application and the second application. The method also includes determining, based on an explicit enumeration of changes in a feature set of the first application and a feature set of the second application, whether the first application is compatible with the second application. The changes are tracked after a known compatibility baseline is defined for the baseline set of features. The first application is compatible with the second application when the feature set of the first application comprises the feature set of the second application. The method further includes communicating a compatibility determination for the first application and the second application.

In a third aspect of the present invention, a system maintaining the compatibility between a first application and a second application based on feature-set constraints is provided. The system includes an application development component configured for communicating one or more applications each with an explicit enumeration of one or more feature changes. The one or more feature changes are tracked after a known compatibility baseline is defined for the baseline set of features. The explicit enumeration identifies the known compatibility baseline. The application development component is further configured for receiving a compatibility check determination for at least one application from the one or more application. The system also includes a deployment component configured for receiving a communication of the one or more applications. The deployment component is further configured for determining, based on the explicit enumeration of one or more feature changes in the one or more applications whether a first application is a compatible with a second application. The first application is compatible with the second application based on matching the known compatibility baseline of the first application and the second application. The deployment component is further configured for determining that the feature set of the first application comprises the feature set of the second application. When the feature set of the second application is at least in part a subset of the first application, the first application is compatible with the second application. The deployment component is also configured for communicating a compatibility determination for the first application and the second application.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "tablets," "mobile computing platforms," "client devices," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
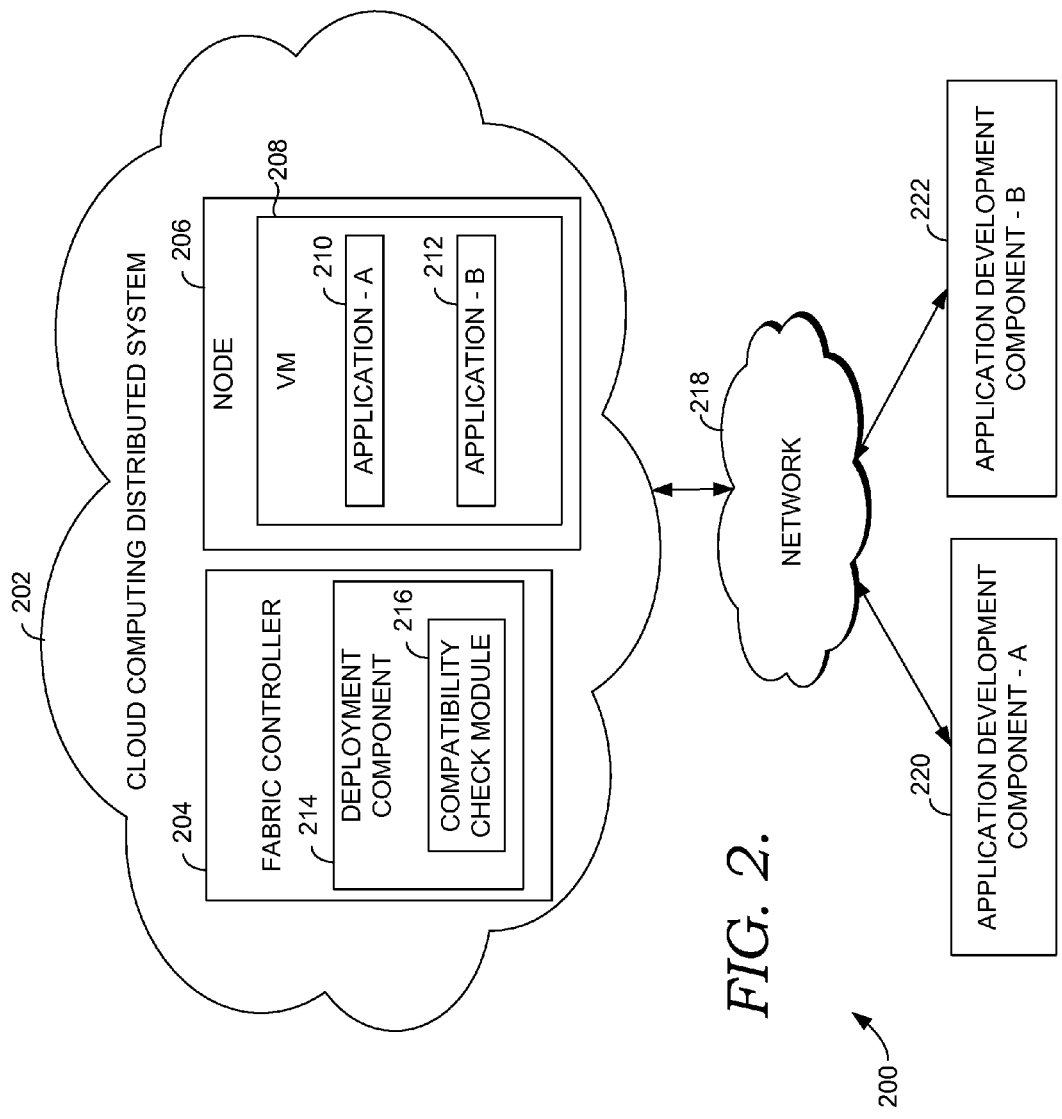
FIG. 2 is a block diagram of an exemplary distributed computing system environment in which embodiments of the invention may be employed.

With additional reference to FIG. 2, a block diagram depicting an exemplary distributed computing system 200 suitable for use in embodiments of the invention described. Generally, the distributed computing system 200 illustrates an environment in which the compatibility check using feature-set constraints is enabled. In particular, embodiments of the present invention provide systems and methods for using the tracked feature changes, of applications with known compatibility baselines, to determine compatibility between the applications. Among other components not shown, the distributed computing system 200 generally includes a cloud computing distributed system 202, a fabric controller 204, a node 206 having a virtual machine—VM 208 running application—A 210 and application—B 212, a deployment component 214 having a compatibility check module 216, and an application development component—A 220 and application development component—B 222, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

Any number of fabric controllers, nodes, virtual machines, applications, and deployment components may be employed in the distributed computing system 200 within the scope of embodiments of the present invention. Some components may comprise a single device/interface or multiple devices/interfaces cooperating in a distributed environment. For instance, the fabric controller 204 may comprise multiple devices and/or modules arranged in a distributed environment that collectively provide the functionality of the fabric controller 204 described herein. Additionally, other components/modules not shown also may be included within the distributed computing system 200.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 2, cloud computing distributed system 202 is part of a distributed computing system that acts to store data or run applications in a distributed manner. For instance, the fabric controller 204 and the collective referred to as application infrastructure (e.g., node 206, VM 208, and application instances) of the cloud computing distributed system 202 function to run one or more portions of an application (e.g., A 210 and B 212). In particular, the fabric controller 204 is configured to deploy, manage, monitor, and maintain applications. Generally, the fabric controller 204 manages all the resources in the cloud computing distributed system 202. An allocator (not shown) of the fabric controller 204 may decide where new applications and restored applications should run, choosing physical servers to optimize hardware utilization. The fabric controller 204 may depend on configuration information of each application to make determinations on deployment of applications. The configuration information may include information on the type and number of roles instances that should be deployed. In embodiments, an agent (not shown) on node 206 may be configured to act as an intermediary in communications between the fabric controller 204 and service-application components.

The fabric controller 204 may work with the deployment component 214 in deploying applications on the cloud computing distributed system. The deployment component 214 may be configured to facilitate the deployment of applications to the cloud computing distributed system 202. The deployment component may deploy new versions of applications that are compatible with other applications to be deployed or already running in the cloud computing distributed system 202. The deployment component 214 may interface with a software development kit (SDK) running on a computing device of an application developer (e.g., A 220 or B 222) or a cloud integrated development environment (IDE) (not shown) to upload new versions of applications for deployment. The deployment component 214 manages several interrelated processes and procedures from application uploading, to migration, and from provisioning to version tracking for installing updates. In particular, the deployment component 214 may include a compatibility check module 216 configured for determining whether two applications are able to run with each other. For example, compatibility check module 216 may check to see if a particular application runs on a software framework. The compatibility check module 216 may receive a first application and a second application, and match a known compatibility baseline for the first application and a second application. The compatibility module may then check the compatibility of the first application and the second application based of the feature-set constraints of the applications, as described below. The feature changes in the feature set of the applications may be tracked by an application developer and published as part of the deployment or compatibility check of the application.

The node 206 in the cloud computing distributed system 202 hosts portions or the application infrastructure (e.g., VM 208, A 210, and B 212). Generally, when one or more applications are being supported by nodes, the nodes may be partitioned into virtual machines with a plurality of role instances that concurrently run the one or more applications. Each role may have a designated function, for example, a web role, or a worker role. VM 208 may run to support the different applications (e.g., a software framework, operating system, a web application, a database system, a gaming application). Each of these applications may be developed by different application developers associated with an application development component (e.g., A 220 and B 222). The application development component may facilitate the development of an application solution that meets the customer requirements. Application development may include physical software design from detailed application requirements. The application development component may utilize an SDK associated with the cloud computing distributed system to build and test applications prior to uploading the applications to the cloud computing distributed system. In embodiments, the application development component may utilize a cloud-based IDE that provides comprehensive facilities for application development. Generally, the application development component manages application development which includes computer programming—the process of writing and maintaining the source code, but in a broader sense of the term it includes all that is involved between the conception of the desired application through to the final manifestation of the software, ideally in a planned and structured process.

In developing applications, the application development component may manage tracking the feature changes between a predecessor version and a successive version. An application may be associated with different types of feature changes including additive changes, major breaking changes, and minor breaking changes. Each change may be tracked using different methods. It is contemplated within embodiments of the present invention that the application development component may facilitate tracking and designating changes as either additive changes, major breaking changes, or minor breaking changes. An additive change may provide a new feature to the application, and may not be intended to break any features. In this regard, application B provides a new feature (e.g. F1) and application A may use this feature. The application developer of A and B may publish this feature set constraint as an additive change.

A major breaking change refers to a change in a feature that alters the compatibility for a substantial number of applications when the applications attempt to run with the changed application. As such, major changes may be designated or published as a new baseline feature set. For example, application A has a baseline feature set (e.g., $AX \subseteq BX$) which has been used to track several different added and removed features.

The application A feature set constraint that may be published with the most recent version of application A may be AX −F1, +F2, +F3 where $AX \subseteq BX$. The application developer of B (e.g., software framework developer) decides to make another change (e.g., +D1, +F4, −C2) and the change is determined to be a major breaking change because it alters compatibility for a substantial number of applications. For example, likely breaking all applications dependent on the features provided in BX. Advantageously, the application developer of B may publish a new baseline feature set (e.g., BX') for application B. Since BX' is a new baseline feature set, its relation to the AX or BX are unknown. Applications must then reestablish a baseline compatibility by testing after any needed modification and publish an assertion that a given application is now compatible with the new baseline i.e., (AX $\subseteq$ BX).

In contrast, a minor breaking change refers to a change in a feature that does not change the compatibility of a substantial number of applications when the applications attempt to run with the changed application. As such, advantageously, minor changes may be designated and published as removed features in the feature set. In this regard, application developers of applications that run with the changed application may opt into the removed features of the changed application.

In addition to tracking the determination an additive change, a major breaking, or a minor breaking change, the application development component may also handle testing configurations of the application that have known minor incompatibilities. Verifying a minor incompatibility allows an application developer associated with an application that depends on the changed application to publish an enumerated required feature set based on testing the minor changes. In embodiments, the application development component may also support compatibility testing for applications associated with a new baseline set for a major breaking change in an application.

It is contemplated within embodiments of the present invention that a long form feature set constraint may include a detailed description of the changes that act as a guide for targeted application compatibility verification. A feature set constraint may be published in a short form associated with a reference table that includes a long form of each enumerated short form entry. Further, the application development component may maintain feature-set constraints in a defined syntax shared by other similarly placed application. The feature-set constraints use the format described herein, and the feature sets may be used to determine compatibility. It should be understood that the exact syntax may vary from the exemplary syntax described herein, as variations and combinations of the feature-set constraints provided are contemplated within the scope of embodiments of the present invention.

The feature-set constraints identify a known baseline compatibility for the application (e.g., AX or BX) and explicitly enumerate feature changes of the application tracked from the known compatibility baseline. As discussed, the application development component may identify both additions and deletions between versions. In addition, the application development component may publish the version changes as feature-set constraints associated with the particular application versions. It is contemplated within embodiments of the present invention that the known compatibility baseline may be redefined based on a recalibration standard. For example, after tracking changes for applications overtime, the known compatibility baseline may be redefined based on a predefined threshold from which the explicit enumeration of changes then begins. The predefined threshold may be a period in the evolution of the application, for example, a software life cycle reset policy or on schedule with a major release cadence of an application (e.g., a software framework), in an exemplary aspect. In addition, the known compatibility baseline may also be a duplicate of known compatibility baseline for a separate infrastructure or vendor. In this regard, an application developer may immediately determine the compatibility for their application.

The application development component may also work with the deployment component 214 to perform a compatibility check, using the feature-set constraints defined by an application, between an application and a target application to confirm the applications are compatible. The feature-set constraints of the applications are compared in order to determine if one feature set is contained within the other or equal to each other, making the applications compatible. Compatibility checking may be performed using an SDK at the application development component, where the application is uploaded to the cloud computing distributed system and compared via the compatibility check module 216 to another application. The application development component may receive a target application for which a first application may be compared to for compatibility. It is contemplated within embodiments of the present invention that an interface at the SDK may be utilized to upload an application to perform a compatibility check, identify a target application for the compatibility, and receive communication of the determination of whether or not the applications are compatible. In embodiments, the application may then proceed to deploy and upgrade the application in the cloud computing distributed system upon a determination that the applications are compatible.

Figure 3:
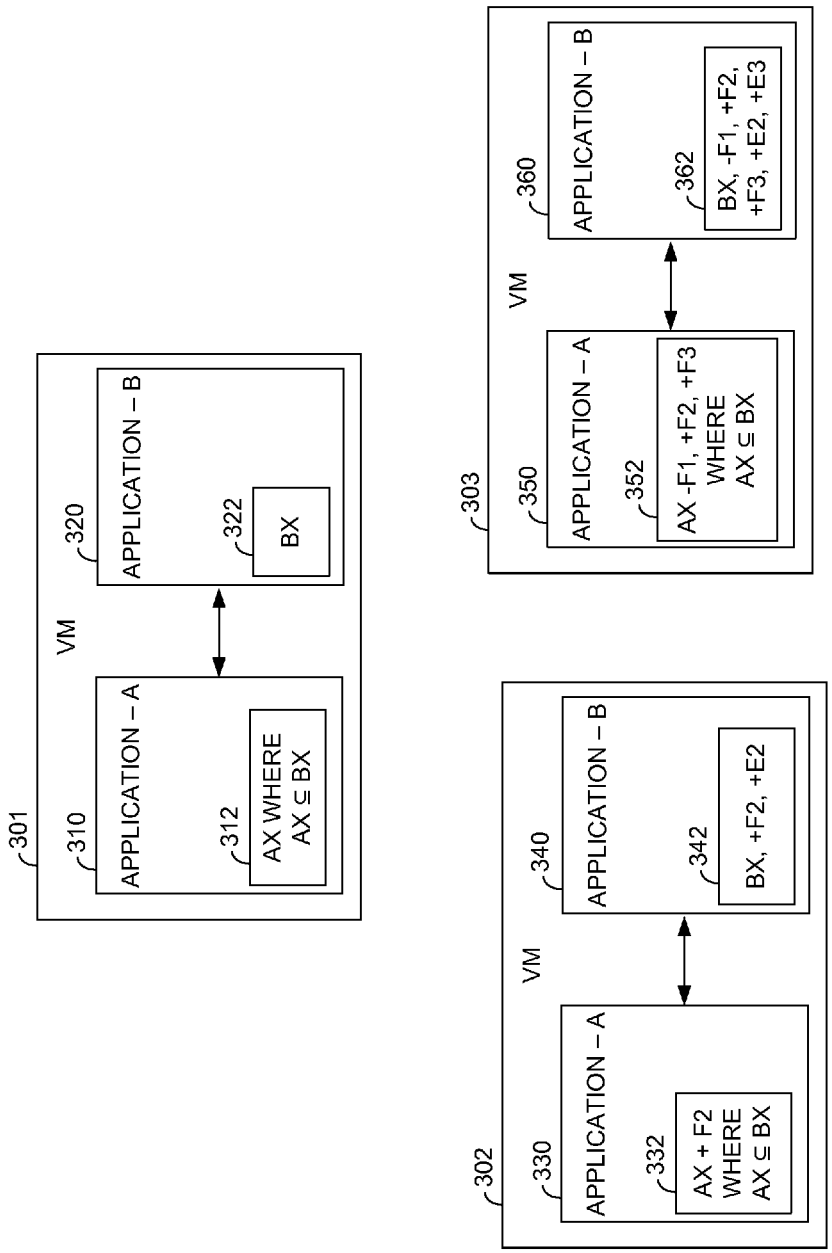
FIG. 3 are schematic diagrams depicting application infrastructure for maintaining compatibility between applications, in accordance with embodiments of the present invention.

Turning now to FIG. 3 showing an application infrastructure for maintaining compatibility between applications in a distributed computing system is provided, in accordance with aspects of the present invention. For exemplary purposes, application—A and application—B are shown running together on virtual machines VM 301, VM 302, and VM 303, each VM running different versions of the applications. Application—A versions include {312, 332, 352} and application—B versions include {322, 342, 362} each respectively associated with {A1, A2, A3} and {B1, B2, B3} as shown in Table 1. Further, for discussion purposes, let application A depend on application B and never the reverse, and B has no dependencies. For example, A is a web application running on B, a software framework. In this regard, application A may be associated with a set of required features and application B associated with a set of provided features.

TABLE 1

| Application | B1-320 | B2-340 | B3-360 |
| --- | --- | --- | --- |
| A1-310 | Compatible | ?? | ?? |
| A2-330 | ?? | ?? | ?? |

TABLE 1-continued

| Application | B1-320 | B2-340 | B3-360 |
| --- | --- | --- | --- |
| A3-350 | ?? | ?? | ?? |

Application A and B each include features. A feature may refer particularly to application behaviors that affect compatibility. In this regard, it may be difficult to identify every application behavior that would be relevant for compatibility with another application when the application is released. Even if this were possible, explicit enumeration of every feature may result in a compatibility matrix that is not scalable, in particular, in a distributed computing environment where several applications are developed with different teams of developers. As such, the compatibility of A and B (i.e., A 310 and B 320) need not be based on an actual explicit set of features in a feature set, but rather a simple determination that one feature set comprises another set, or in other words, one feature set is a subset of the other feature set.

Initially, a known compatibility baseline of A 310 and B 320 may be determined. The known compatibility baseline may be identified at the initial release of A 310 and/or B 320 on VM 301. In operation, the known compatibility baseline may be based on a compatibility testing process. Compatibility testing is performed between the applications to evaluate their compatibility with each other. Compatibility testing may also include certification testing. For example, an application developer may run a complete suite of tests on a new operating environment to get the application certified for the software framework, databases, or platform. Any variations of compatibility testing and combinations thereof are contemplated within the scope of embodiments of the present invention.

Determining compatibility between applications through compatibility testing provides strong empirical evidence that all the required features of application A 310 are provided by application B 320. In this regard, a compatibility baseline is determined without explicit enumeration of individual features in A 310 or B 320. The known compatibility baseline may be published by application developer of A 310, tagged as: AX ⊆ BX. The initial assertion that AX is a subset of BX is based on the known compatibility baseline, in that, even though the explicit features of AX or BX are unknown their compatibility (i.e. A runs on B) supports this assertion. Thus, an application (e.g., A 310) that runs on a software framework (e.g., B 320) may be published with a tag [AX where ⊆ BX]—312 as its feature set constraint. Application developer of B 320 may simply publish a tag [BX]—322 because B 320 has no dependencies as stated earlier.

Each version of application A and B past the known compatibility baseline may track changes in the feature set, as shown in Table 2A and 2B. In embodiments, the application A and the feature set and the application B and the feature set are input into a compatibility check component for determining compatibility between A and B.

TABLE 2A

| Application | Required Features Set Constraints | Provided Feature-Set Constraints |
| --- | --- | --- |
| A1 | AX where AX ⊆ BX | |
| A2 | AX +F2 where AX ⊆ BX | |
| A3 | AX −F1, +F2, +F3 where AX ⊆ BX | |

TABLE 2B

| Application | Required Feature-Set Constraints | Provided Feature-Set Constraints |
|---|---|---|
| B1 | | BX |
| B2 | | BX +F2, +E2 |
| B3 | | BX −F1, +F2, +F3, +E2, +E3 |

Accordingly, by way of example, to determine the compatibility of a version of A and a version of B, the compatibility check component evaluates the features of A against the features of B. The compatibility check is based on the tracking of feature changes in applications. The compatibility check component may check if A and B are compatible by evaluating whether the features required by a given version of A are included in the features provided by a given version of B, as shown. It is contemplated that the feature sets may be tracked using set theory constraints, as shown in Tables 2A and 2B. The language of constraints takes advantage of the fact that each release of a component is mostly similar to the previous release. Thus, the set constraints include a statement of the known compatibility baselines with a set of additions and removals relative to the baseline.

With reference to VM 302 running A 330 and B 340, when the application developer of A 330 develops the application, the application developer may determine that a new feature F2 is needed on B 320 for A 330 to work. Basically, A 330 does not run on B 320. The application developer of A 330 may request the application developer of B 320 to add the F2 feature into a release. Adding this new feature in embodiments of the present invention requires that the application developer, via an application development component, to explicitly tag the new B 340 with the feature F2 and any other features added. In this regard, A 330 may be published with a tag [AX +F2 where AX⊆BX] —332 that is a subset of B 340 tag [BX +F2, +E2] —342, where E2 is another feature added to the B 340 application release.

Similarly the application developer of A 330 may request a feature F3 added to B 340. The application developer of B 340 may identify an incompatibility that requires removal of the F1 feature in order to introduce F3. F1 is a feature that had not been explicitly tracked but part of the A 310 and B 320—known compatibility baseline. The application developer of B 360 may publish B 360 with a tag [BX −F1, +F2, +F3, +E2, +E3]—362 that explicitly tracks the addition of F3 and the removal of F1. Again, compatibility checks may simply be based on comparing feature-set constraints of B 360 and A 350, published with a tag [AX −F1, +F2, +F3 where AX ⊆ BX]—352. Advantageously, with embodiments of the present invention, from release to release the application developer of versions of A and the application developer of versions of B negotiate the addition and removal of features without having an agreement on the full feature set of the applications. To this point, the feature F1 becomes a feature to track only after it is explicitly removed and not prior because F1 belonged in the known compatible baseline. The final compatibility determinations based on comparing tracked feature set changes are shown below.

TABLE 3

| Application | B1-320 | B2-340 | B3-360 |
|---|---|---|---|
| A1-310 | Compatible | Compatible | Incompatible |
| A2-330 | Incompatible | Compatible | Incompatible |
| A3-350 | Incompatible | Incompatible | Compatible |

Figure 4:
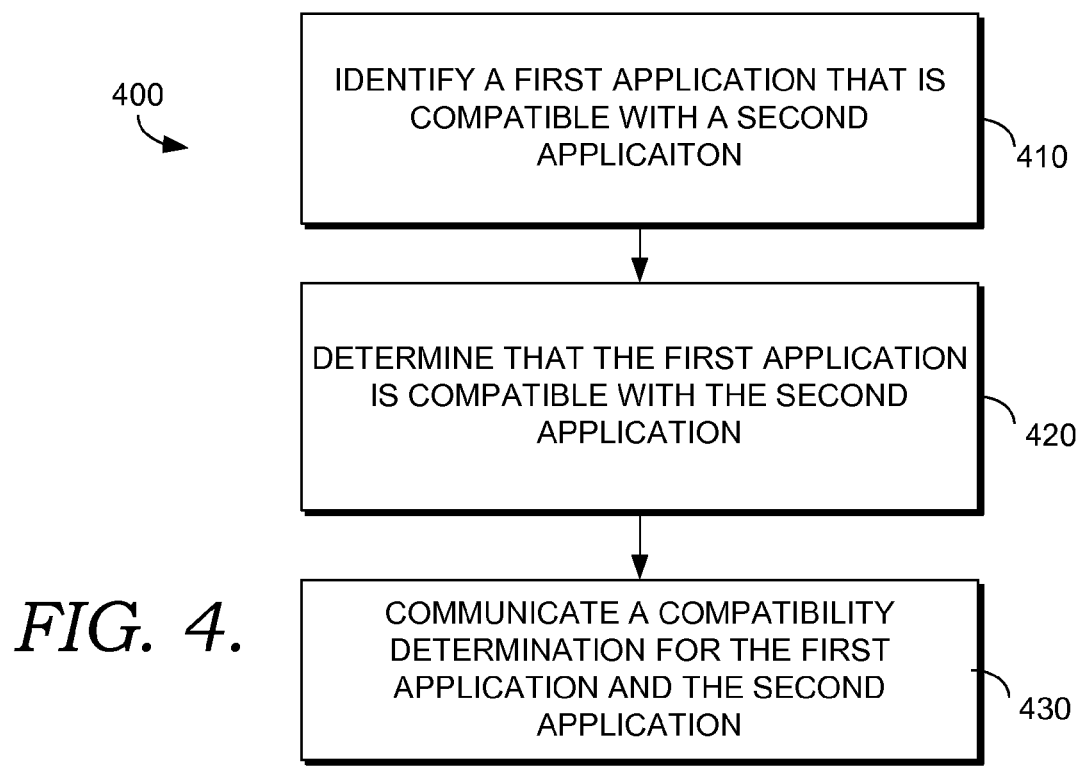
FIG. 4 is a flow diagram showing a method for maintaining compatibility between applications, in accordance with embodiments of the present invention.

Turning now to FIG. 4, a flow diagram is provided that illustrates a method 400 for maintaining compatibility between applications. At block 410, a first application that is compatible with a second application is identified based on a baseline set of features associated with the first application and the second application. The first application may be dependent on the second application where the first application is associated with a required feature set and the second application is associated with a provided feature set. At block 420, it determined, based on comparing an explicit enumeration of added features or removed features in a feature set of the first application and a feature set of the second application, that the first application is compatible with the second application, wherein the added features or removed features are tracked after a known compatibility baseline is defined for the baseline set of features. The baseline set of features are associated with the known compatibility baseline determined based on performing a compatibility test between the first application and the second application. At block 430, a determination that the first application and the second application are compatible is communicated. In embodiments, communicating the determination that the first application and the second application are compatible may trigger a deployment procedure for the first application or the second application onto the distributed computing system.

Figure 5:
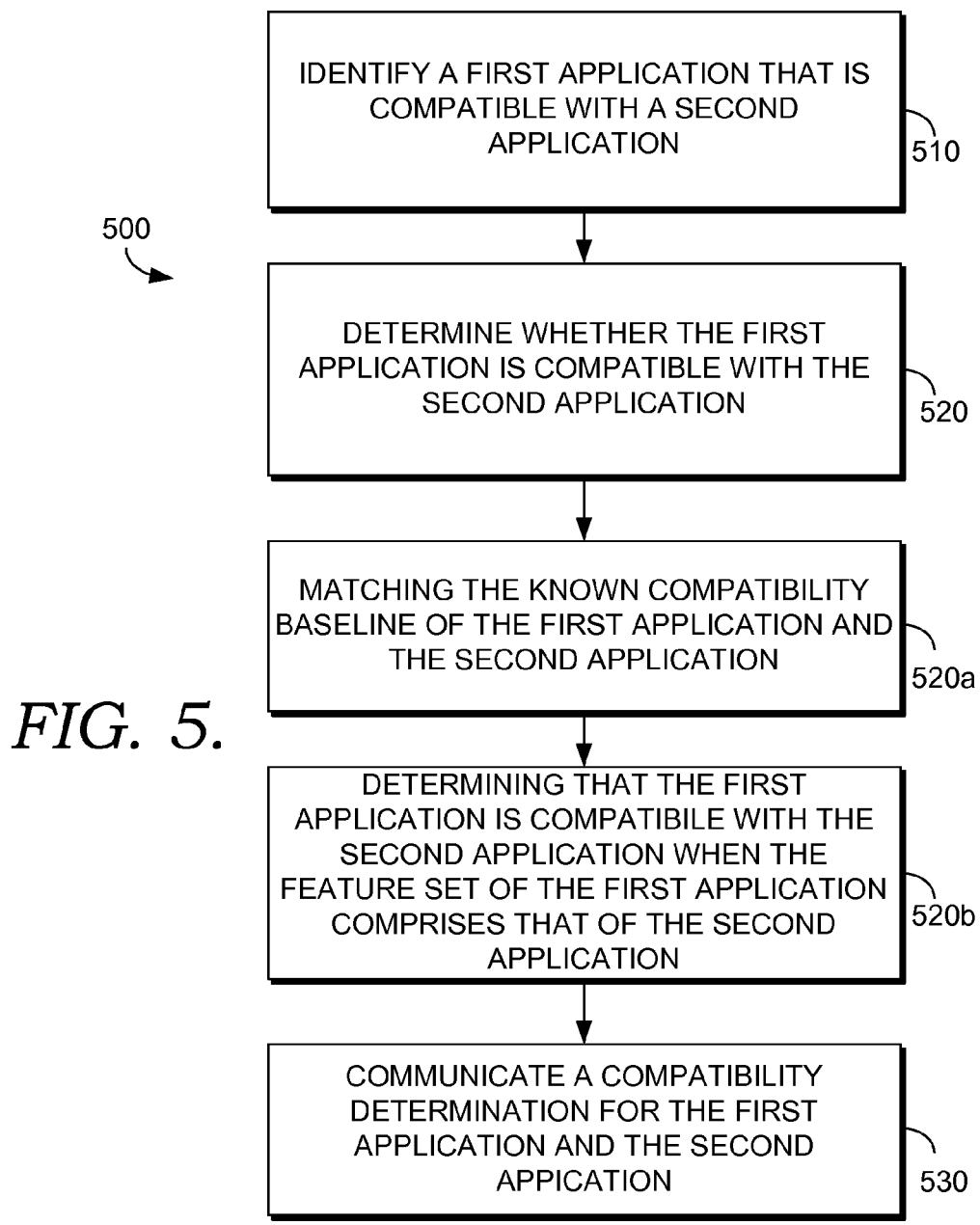
FIG. 5 is a flow diagram showing a method for maintaining compatibility between applications, in accordance with embodiments of the present invention.

Turning now to FIG. 5, a flow diagram is provided that illustrates a method 500 for maintaining compatibility between applications. At block 510, a first application that is compatible with a second application based on a baseline set of unenumerated features associated with the first application and the second application is identified. At block 520, whether the first application is compatible with a second application is determined based on an explicit enumeration of changes in a feature set of the first application and a feature set of the second application whether the first application is compatible with the second application. At block 520a the first of two steps in determining whether a first application is compatible with a second application, the known compatibility baseline of the first application is matched with the known compatibility baseline of the second application. The changes are tracked after a known compatibility baseline is defined for the baseline set of features. At block 520b, it is determined that the feature set of the first application is compatible with the second application when the feature set of the first application comprises the feature set of the second application. The feature set of the second application is at least in part a subset of the first application. At block 530, a determination that the first application and the second application are compatible is communicated.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when used by one or more distributed computing systems, cause the one or more distributed computing systems to perform a method for maintaining compatibility between applications based on feature-set constraints, the method comprising:

identifying a first application that is compatible with a second application, wherein the first application being compatible with the second application signals a known compatibility baseline having a baseline set of unenumerated features associated with the first application and the second application, the known compatibility baseline is defined without explicit enumeration of features in the first application and the second application;

without explicit enumeration of features of the first application and the second application prior to the known compatibility baseline, comparing a first explicit enumeration of added features or removed features in a feature set of the first application to a second explicit enumeration of added features or removed features in a feature set of the second application, wherein the added features or the removed features are tracked for the first application and the second application after the known compatibility baseline;

determining, based on the first explicit enumeration of added features or removed features in the feature set of the first application corresponding to the second explicit enumeration of added features or removed features in the feature set of the second application, that the first application is compatible with the second application; and communicating a determination that the first application and the second application are compatible.

2. The media of claim 1, wherein the first application is dependent on the second application.

3. The media of claim 2, wherein the first application is associated with a required feature set, and the second application is associated with a provided feature set.

4. The media of claim 1, wherein the baseline set of features are associated with the known compatibility baseline determined based on performing a compatibility test between the first application and the second application.

5. The media of claim 4, wherein the baseline set of features are not explicitly enumerated, such that, compatibility is determined based on explicit changes over time not explicit enumeration of features of the first application and the second application.

6. The media of claim 4, the known compatibility baseline is a duplicate of a known compatibility baseline of a different distributed system.

7. The media of claim 4, wherein the known compatibility baseline is redefined based on a predefined threshold application evolution, wherein redefining the known compatibility baseline resets the baseline set of features from which to track feature changes of an application.

8. The media of claim 1, wherein a major breaking change of an application triggers a new baseline feature set for the application, wherein the major breaking change alters a compatibility of a substantial number of applications.

9. The media of claim 1, wherein the removed features are associated with a minor breaking change feature that does not alter a compatibility for a substantial number of applications such that an application opts into the removed features.

10. The media of claim 1, wherein communicating the determination that the first application and the second application are compatible triggers a deployment procedure for the first application or the second application onto the distributed computing system.

11. One or more computer storage media storing computer-useable instructions that, when used by one or more distributed computing systems, cause the one or more distributed computing systems to perform a method for maintaining compatibility between applications based on feature-set constraints, the method comprising:

identifying a first application that is compatible with a second application based on a baseline set of unenumerated features associated with the first application and the second application, the baseline set of unenumerated features defines a known compatibility baseline based on the first application being compatible with the second application, without explicit enumeration of features in the first application and the second application;

determining without explicit enumeration of features in the first application and the second application, and based on an explicit enumeration of changes in a feature set of the first application and a feature set of the second application~ whether the first application is compatible with the second application, wherein the changes are tracked after the known compatibility baseline wherein compatibility between the first application and the second application is based on the explicit enumeration of changes in the first application corresponding with the second application, wherein the feature set is published in a short form associated with a reference table that include a long form of each enumerated short form entry; and communicating a compatibility determination for the first application and the second application.

12. The media of claim 11, wherein determining whether the first application and the second application are compatible further comprises;

matching the known compatibility baseline of the first application and the second application; and determining that the first application is compatible with the second application when the feature set of the first application comprises the feature set of the second application, wherein when the feature set of the second application is at least in part a subset of the first application.

13. The media of claim 11, wherein the long form comprises a detailed description that acts a guide for a targeted application compatibility verification.

14. The media of claim 11, further comprising:

determining that the first application is not compatible with the second application, wherein the feature set of the first application does not comprise the feature set of the second application;

comparing the first application with one or more versions of the second application, wherein the one or more versions of the second application enumerate the known compatibility baseline associated with the baseline set of unenumerated features; and determining whether the first application is compatible with the one or more versions of the second application.

15. A system for maintaining application compatibility based on feature-set constraints, the system comprising a processing unit coupled to a computer storage medium, the computer storage medium having stored thereon a plurality of computer components executable by the processing unit, the computer components comprising:

an application development component configured for:
        communicating one or more applications each with an explicit enumeration of one or more feature changes, wherein the one or more feature changes are tracked after a known compatibility baseline is defined for a baseline set of unenumerated features; and
        receiving a compatibility check determination for at least one application from the one or more applications;

a deployment component configured for:

receiving a communication of the one or more applications; and determining, based on the explicit enumeration of one or more feature changes in the one or more applications whether a first application is compatible with a second application, wherein the first application is compatible with the second application based on:

matching the known compatibility baseline of the first application and the second application, wherein the known compatibility baseline is matched based at least on a published tag corresponding to the known compatibility baseline, the baseline set of unenumerated features defines the known compatibility baseline based on the first application being compatible with the second application, without explicit enumeration of features in the first application and the second application; and determining, without explicit enumeration of features in the first application and the second application prior the known compatibility baseline, that changes in the feature set of the first application correspond to changes in the feature set of the second application, wherein when changes in the feature set of the second application are at least in part a subset of changes in the first application, the first application is compatible with the second application; and communicating a compatibility determination for the first application and the second application.

16. The system of claim 15, wherein the system is further configured for providing cloud computing platform as a service (PaaS) having a computing platform and a solution stack.

17. The system of claim 15, wherein the application development component is further configured for:
   developing the one or more applications;
   tagging the one or more applications with the explicit enumeration of one or more feature changes based on a defined syntax; and
   publishing the one or more applications such that the explicit enumeration of one or more feature changes is available to application developers.

18. The system of claim 15, wherein the application development component is further configured for:
   determining an additive change, wherein the additive communicates non-breaking added features;
   determining a major breaking change, wherein the major breaking change triggers the publishing of a new baseline compatibility set; and
   determining a minor breaking change, wherein the minor breaking change is published for opting into removed features.

19. The system of claim 18, wherein a determination of a breaking change type is based on compatibility testing verifying the breaking change type.

* * * * *